US010562537B2

(12) United States Patent
Hiwatashi et al.

(10) Patent No.: US 10,562,537 B2
(45) Date of Patent: Feb. 18, 2020

(54) VEHICLE CONTROL DEVICE

(71) Applicant: MAZDA MOTOR CORPORATION, Hiroshima (JP)

(72) Inventors: Keiichi Hiwatashi, Hiroshima (JP); Daisuke Umetsu, Hiroshima (JP); Osamu Sunahara, Hiroshima (JP); Yasunori Takahara, Hiroshima (JP); Daisaku Ogawa, Hiroshima (JP); Takahiro Kawamura, Hiroshima (JP); Chikako Ohisa, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 169 days.

(21) Appl. No.: 15/713,330

(22) Filed: Sep. 22, 2017

(65) Prior Publication Data

US 2018/0086349 A1  Mar. 29, 2018

(30) Foreign Application Priority Data

Sep. 29, 2016 (JP) .................................. 2016-191216

(51) Int. Cl.
    *B60W 40/105* (2012.01)
    *B60W 10/02* (2006.01)
    (Continued)

(52) U.S. Cl.
    CPC .......... *B60W 40/105* (2013.01); *B60W 10/02* (2013.01); *B60W 10/04* (2013.01);
    (Continued)

(58) Field of Classification Search
    CPC .... B60W 40/105; B60W 10/02; B60W 10/04; B60W 40/10; B60W 2510/0275;
    (Continued)

(56) References Cited

U.S. PATENT DOCUMENTS 6,208,927 B1 * 3/2001 Mine .................. B60K 31/0058
    701/70
6,553,297 B2 * 4/2003 Tashiro ................ B60W 50/06
    701/48

(Continued)

FOREIGN PATENT DOCUMENTS

| JP | 2003-200764 A | 7/2003 |
| JP | 2014-166014 A | 9/2014 |
| JP | 2015-089251 A | 5/2015 |

OTHER PUBLICATIONS

An Office Action; "Notice of Reasons for Rejection," mailed by the Japanese Patent Office dated Jul. 31, 2017, which corresponds to Japanese Patent Application No. 2016-191216; with English language Concise Explanation.

*Primary Examiner* — Tinh Dang
(74) *Attorney, Agent, or Firm* — Studebaker & Brackett PC

(57) ABSTRACT

The vehicle control device is designed to control a vehicle equipped with an engine, and an automatic transmission comprising a torque converter with a lockup clutch. The vehicle control device comprises a controller configured to perform control of changing an engagement degree of the lockup clutch and to, when such a condition that the vehicle is traveling and a steering angle-related value as a parameter related to a steering angle of a steering apparatus of the vehicle increases is satisfied, reduce an output torque of the engine to generate a deceleration of the vehicle to thereby execute a torque reduction control for controlling an attitude of the vehicle. The controller is configured to reduce the output torque of the engine, in accordance with the engagement degree of the lockup clutch controlled by a lockup control.

20 Claims, 8 Drawing Sheets

(51) Int. Cl.
*B60W 10/04* (2006.01)
*B60W 40/10* (2012.01)
*F02P 5/15* (2006.01)

(52) U.S. Cl.
CPC ........... *B60W 40/10* (2013.01); *F02P 5/1504* (2013.01); *B60W 2510/0275* (2013.01); *B60W 2510/0657* (2013.01); *B60W 2520/10* (2013.01); *B60W 2520/14* (2013.01); *B60W 2520/16* (2013.01); *B60W 2520/18* (2013.01); *B60W 2540/10* (2013.01); *B60W 2540/18* (2013.01); *F02P 5/15* (2013.01)

(58) Field of Classification Search
CPC ..... B60W 2510/0657; B60W 2520/10; B60W 2520/14; B60W 2520/16; B60W 2520/18; B60W 2540/10; B60W 2540/18; F02P 5/1504; F02P 5/15
See application file for complete search history.

(56) References Cited

U.S. PATENT DOCUMENTS

| | | | | |
|---|---|---|---|---|
| 10,300,914 | B2* | 5/2019 | Okada | B60K 17/04 |
| 2005/0218718 | A1* | 10/2005 | Iwatsuki | B60T 8/1766 |
| | | | | 303/177 |
| 2018/0072317 | A1* | 3/2018 | Hiwatashi | F02D 41/021 |

* cited by examiner

VEHICLE CONTROL DEVICE

BACKGROUND OF THE INVENTION

Field of the Invention

The present invention relates to a vehicle control device, and more particularly to a vehicle control device for performing engine control to realize a desired vehicle attitude (vehicle behavior).

Description of Related Art

Heretofore, there has been known a control device capable of, in a situation where a behavior of a vehicle becomes unstable due to road wheel slip or the like, controlling the vehicle behavior to enable a safe traveling (e.g., an antiskid brake device). Specifically, there has been known a control device operable to detect the occurrence of vehicle understeer or oversteer behavior during vehicle cornering or the like, and apply an appropriate degree of deceleration to one or more road wheels so as to suppress such a behavior.

There has also been known a vehicle motion control device operable to adjust a deceleration of a vehicle during vehicle cornering to thereby adjust load to be applied to front road wheels as steerable road wheels so as to enable a series of driver's operations (braking, turning of a steering wheel, accelerating, turning-back of the steering wheel, etc.) during vehicle cornering under a normal traveling condition to be realized naturally and stably, differently from the aforementioned control for improving safety in a traveling condition causing the vehicle behavior to become unstable.

Further, there has been proposed a vehicle behavior control device operable to reduce a vehicle driving force according to yaw rate-related quantity corresponding to a steering wheel operation by a driver (e.g., yaw acceleration), thereby making it possible to quickly generate vehicle deceleration in response to start of the steering wheel operation by the driver and thus quickly apply a sufficient load to front road wheels as steerable road wheels (JP 2014-166014A).

In this vehicle behavior control device, in response to start of the steering wheel operation, load is quickly applied to the front road wheels to cause an increase in frictional force between each of the front road wheels and a road surface and thus an increase in cornering force of the front road wheels, thereby providing an improved turn-in ability of the vehicle in an initial phase after entering a curve, and an improved responsivity with respect to a turning operation of a steering wheel (i.e., vehicle's steering stability). This makes it possible to realize a vehicle behavior as intended by the driver.

BRIEF SUMMARY OF THE INVENTION

Technical Problem

Meanwhile, heretofore, there has been known a technique of providing various engagement elements in a driving force transmitting mechanism for transmitting a vehicle driving force to road wheels, so as to execute control of changing a degree of engagement (engagement degree) of each of the engagement elements according to a vehicle driving state (engagement degree change control). If such an engagement degree change control is executed simultaneously with the control of reducing a vehicle driving force so as to generate a deceleration of the vehicle according to a steering wheel operation by a driver, as described in the Patent Document 1 (vehicle attitude control), the following problem is likely to occur. That is, when the engagement degree of the engagement element is changed by the engagement degree change control during reduction of the vehicle driving force by the vehicle attitude control, there is a possibility of failing to reduce torque in a manner appropriate for controlling a vehicle attitude and thus to realize a desired vehicle attitude.

This problem will be more specifically described by taking, as one example, a case where the driving force transmitting mechanism comprises a torque converter with a lockup clutch, wherein the engagement element is the lockup clutch. As regards a degree of engagement (engagement degree) of the lockup clutch, it is desirable to set the lockup clutch to a fully engaged state, in view of fuel economy, whereas it is desirable to set the lockup clutch to a slip state or a fully disengaged state, in a situation or a vehicle driving region requiring acceleration or vibration reduction. Therefore, it is common practice to perform control of changing the engagement degree of the lockup clutch, according to a driving state such as accelerator position or vehicle speed. In this case, when the engagement degree of the lockup clutch is changed in response to a change in the driving state such as accelerator position or vehicle speed, during execution of the vehicle attitude control, it becomes impossible to reduce torque in a manner appropriate for controlling the vehicle attitude and thus realize a desired vehicle attitude. For example, when the engagement degree of the lockup clutch is reduced during the vehicle attitude control, it becomes impossible to reduce torque sufficiently enough to control the vehicle attitude.

The present invention has been made in view of solving the above conventional problem, and an object thereof is to provide a vehicle control device configured to reduce an output torque of a driving source so as to generate a deceleration of a vehicle according to a steering action, wherein the vehicle control device is capable of adequately reducing the output torque of the driving source according to an engagement degree of an engagement element provided in a driving force transmitting mechanism for transmitting the output torque of the driving source to road wheels.

Solution to Problem

In order to achieve the above object, according to one aspect of the present invention, there is provided a vehicle control device, including: a driving source configured to generate torque as a driving force for vehicle traveling; a driving source adjusting mechanism configured to adjust an output torque of the driving source; a driving force transmitting mechanism configured to transmit the output torque of the driving source to road wheels; an engagement element provided in the driving force transmitting mechanism; an engagement degree change control part configured to perform control of changing an engagement degree of the engagement element; and a vehicle attitude control part configured to control the driving source adjusting mechanism to reduce the output torque of the driving source to thereby generate a deceleration of the vehicle so as to control an attitude of the vehicle, when such a condition that the vehicle is traveling and a steering angle-related value as a parameter related to a steering angle of a steering apparatus of the vehicle increases is satisfied, wherein the vehicle attitude control part is configured to control the driving source adjusting mechanism to reduce the output torque of the driving source, in accordance with the engagement degree of the engagement element controlled by the engagement degree change control part.

In the above vehicle control device of the present invention, when performing the vehicle attitude control of generating a deceleration of the vehicle to control the vehicle attitude, the vehicle attitude control part is operable to reduce the output torque of the driving source according to the engagement degree of the engagement element set by an engagement degree change control. That is, the vehicle attitude control part is operable to control the reduction of the output torque of the driving source according to the engagement degree. Thus, even when the engagement degree of the engagement element is changed during the vehicle attitude control, it is possible to ensure torque reduction (the term "torque" herein means a torque to be applied as a vehicle driving force to the road wheels) appropriate for controlling the vehicle attitude by a vehicle attitude control. This makes it possible to apply, to the vehicle, a desired deceleration for controlling the vehicle attitude. Therefore, the present invention can control the vehicle attitude with good responsivity with respect to a steering action performed by a driver, so as to accurately realize a vehicle behavior as intended by the driver, i.e., adequately improve steering stability of the vehicle.

Preferably, in the vehicle control device of the present invention, when the engagement degree is a first engagement degree, the vehicle attitude control part is configured to control the driving source adjusting mechanism such that a reduction rate of the output torque of the driving source becomes greater than when the engagement degree is a second engagement degree greater than the first engagement degree.

According to this feature, the output torque of the driving source can be reduced at an adequate reduction rate according to the engagement degree of the engagement element. That is, considering that, when the engagement degree is relatively small, the torque to be transmitted to the road wheels via the driving force transmitting mechanism tends to be reduced as compared to when the engagement degree is relatively large, even under the same condition in terms of the output torque of the driving source, the reduction rate of the output torque of the driving source can be increased when the engagement degree is relatively small.

Preferably, in the vehicle control device of the present invention, the vehicle attitude control part is configured to control the driving source adjusting mechanism such that the reduction rate of the output torque of the driving source becomes greater as the engagement degree becomes smaller.

According to this feature, the output torque of the driving source can also be reduced at an adequate reduction rate according to the engagement degree of the engagement element.

Preferably, in the vehicle control device of the present invention, the vehicle attitude control part is configured to execute the control of reducing the output torque of the driving source in accordance with the engagement degree of the engagement element, only when at least one of a speed of change in the engagement degree controlled by the engagement degree change control part, an amount of change in the engagement degree controlled by the engagement degree change control part, and a difference between a target value and an actual value of the engagement degree controlled by the engagement degree change control part, is equal to or greater than a given value.

According to this feature, it becomes possible to suppress a situation where, in response to a slight change in the engagement degree, a slight change in the output torque of the driving source is frequently performed, causing the occurrence of hunching in the vehicle attitude control.

In the vehicle control device of the present invention, the driving force transmitting mechanism may comprise a torque converter with a lockup clutch, wherein the engagement element may be the lockup clutch.

Preferably, in the vehicle control device of the present invention, the engagement degree change control part is configured to change the engagement degree of the engagement element, based on a vehicle speed-related value as a parameter related to a vehicle speed, and an accelerator position-related value as a parameter related to an accelerator position.

According to this feature, it becomes possible to adequately change the engagement degree of the engagement element, based on a vehicle driving state defined by the vehicle speed-related value and the accelerator position-related value.

Preferably, in the vehicle control device of the present invention, when the vehicle is further equipped with a steering angle sensor configured to detect the steering angle of the steering apparatus, the vehicle attitude control part is configured, when the vehicle is traveling, and a speed of change in the steering angle detected by the steering angle sensor is equal to or greater than a given value, to control the driving source adjusting mechanism to reduce the output torque of the driving source.

The present invention can provide a vehicle control device configured to reduce an output torque of a driving source so as to generate a deceleration of a vehicle according to a steering action, wherein the vehicle control device is capable of adequately reducing the output torque of the driving source according to an engagement degree of an engagement element provided in a driving force transmitting mechanism for transmitting the output torque of the driving source to road wheels.

DETAILED DESCRIPTION OF THE INVENTION

With reference to the accompanying drawings, a vehicle control device according to one embodiment of the present invention will now be described.

<System Configuration>

Figure 1:
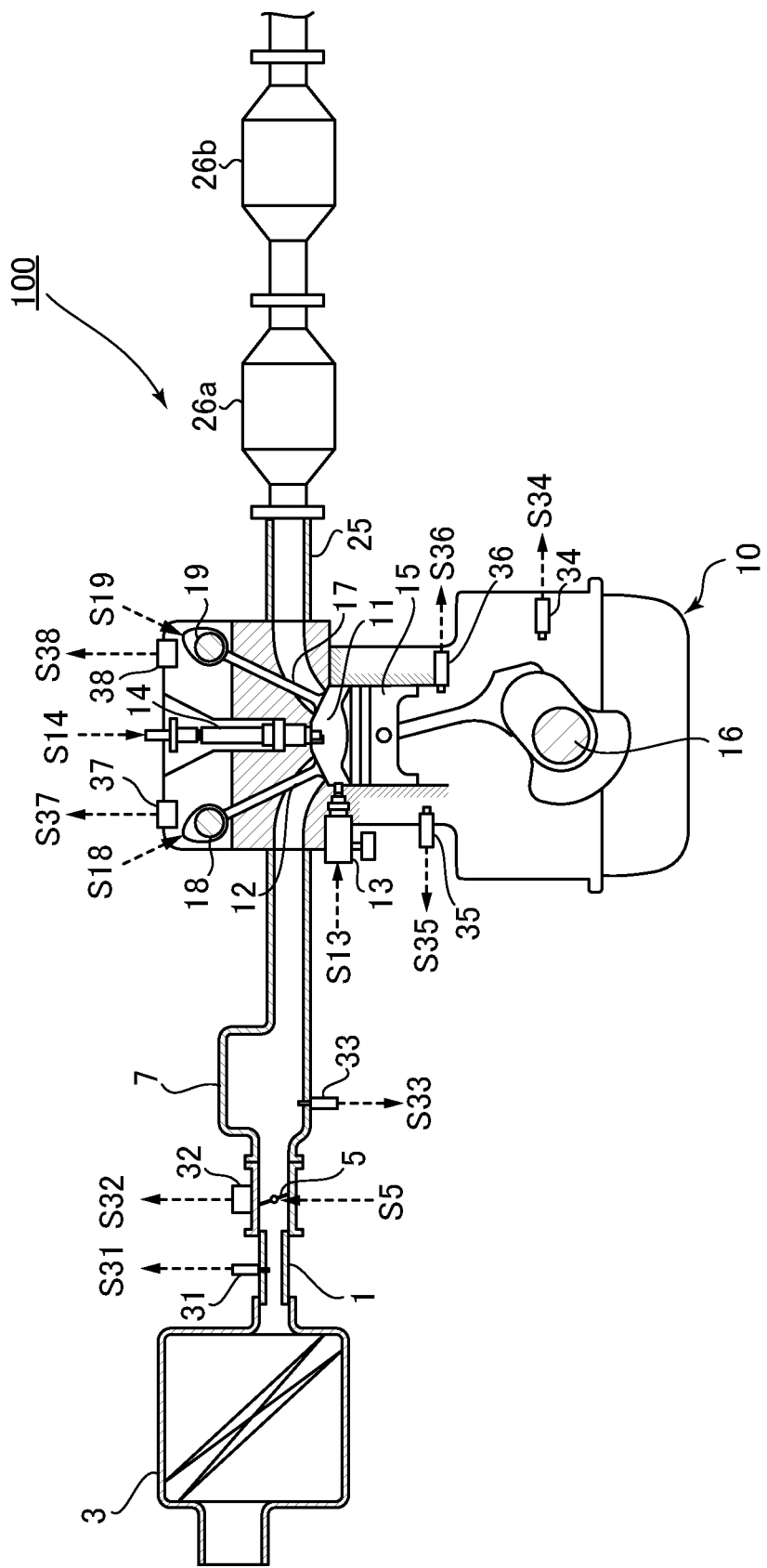
FIG. 1 is a schematic diagram depicting a configuration of an engine system in a vehicle employing a vehicle control device according to one embodiment of the present invention.

First of all, with reference to FIGS. 1 and 2, an engine system in a vehicle employing a vehicle control device according to one embodiment of the present invention will be described. FIG. 1 is a schematic diagram depicting a configuration of an engine system in a vehicle employing a vehicle control device according to one embodiment of the present invention, and FIG. 2 is a block diagram depicting an electrical configuration of the vehicle control device according to this embodiment.

Figure 2:
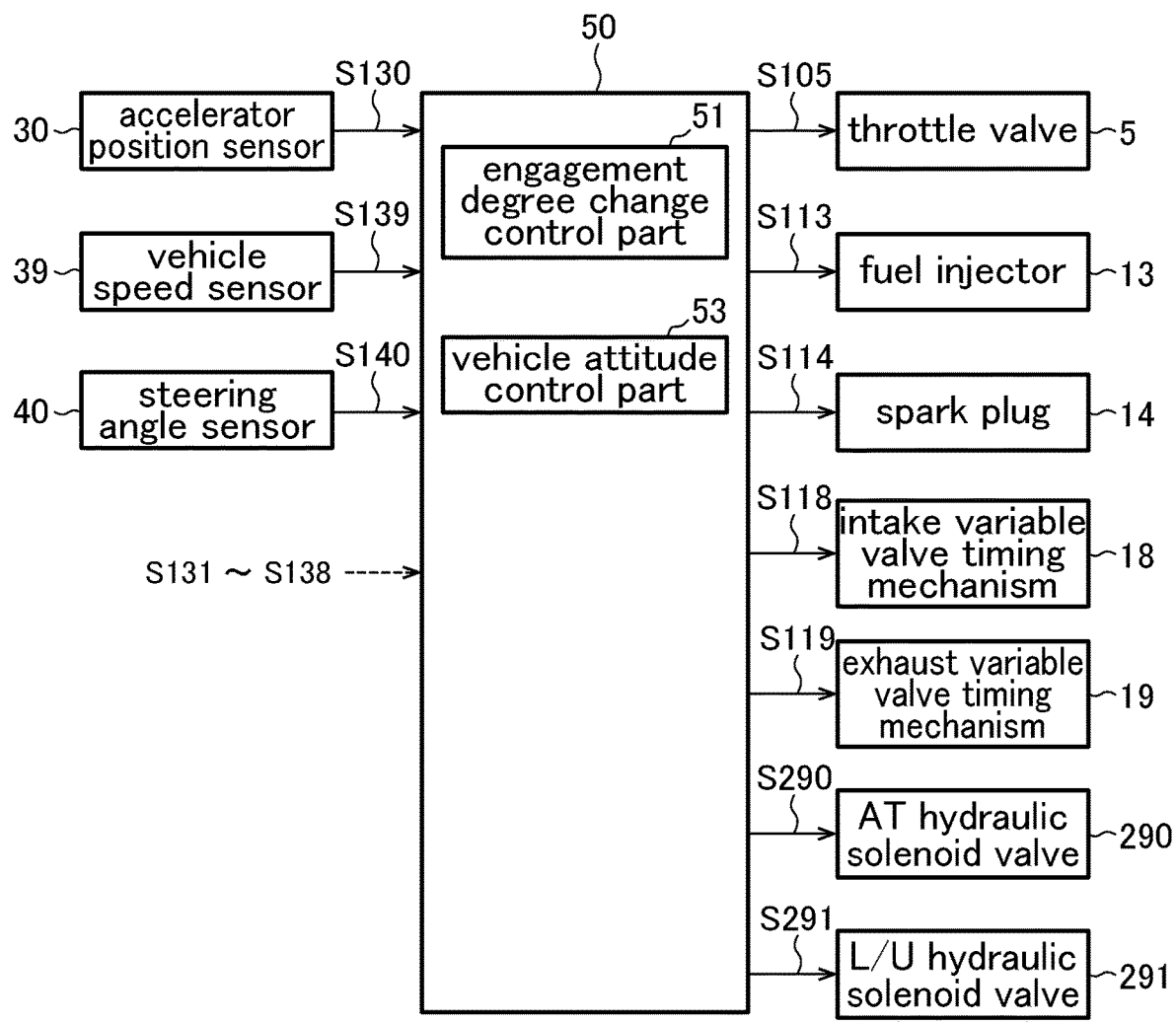
FIG. 2 is a block diagram depicting an electrical configuration of the vehicle control device according to this embodiment.

As depicted in FIGS. 1 and 2, the engine system 100 primarily comprises: an intake passage 1 for allowing intake air (air) introduced from outside to pass therethrough; an engine 10 for generating a vehicle driving force through combustion of a mixture of intake air supplied from the intake passage 1 and fuel supplied from an aftermentioned fuel injector 13; an exhaust passage 25 for discharging exhaust gas produced by the combustion within the engine 10; a plurality of sensors 30 to 40 for detecting various states in the engine system 100; and a controller 50 for controlling an entirety of the engine system 100.

The intake passage 1 is provided with an air cleaner 3 for cleaning intake air introduced from outside, a throttle valve 5 for adjusting an amount of intake air passing therethrough (intake air amount), and a surge tank 7 for temporarily reserving intake air to be supplied to the engine 10, which are arranged in this order from the side of an upstream end of the intake passage 1.

The engine 10 is primarily provided with: an intake valve 12 for selectively introducing intake air from the intake passage 1 into a combustion chamber 11; a fuel injector 13 for injecting fuel toward the combustion chamber 11; a spark plug 14 for igniting a mixture of the intake air and the fuel supplied into the combustion chamber 11; a piston 15 configured to be reciprocatingly moved according to combustion of the air-fuel mixture within the combustion chamber 11; a crankshaft 16 configured to be rotated according to the reciprocating movement of the piston 15; and an exhaust valve 17 for selectively discharging, to the exhaust passage 25, exhaust gas produced by the combustion of the air-fuel mixture within the combustion chamber 11.

The engine 10 is configured such that operation timings (which are equivalent to valve phases) of the intake valve 12 and the exhaust valve 17 are variably controlled, respectively, by an intake variable valve timing mechanism 18 and an exhaust variable valve timing mechanism 19 which serve as a variable valve timing mechanism. As each of the intake variable valve timing mechanism 18 and the exhaust variable valve timing mechanism 19, one of various heretofore-known types of variable valve timing mechanisms may be applied. For example, a variable valve timing mechanism of an electromagnetic type or a hydraulic type may be employed to variably control the operation timings of the intake valve 12 and the exhaust valve 17.

The exhaust passage 25 is provided with a plurality of exhaust gas purifying catalysts 26a, 26b having exhaust gas purifying functions, such as a NOx catalyst, a three-way catalyst and an oxidation catalyst. In the following description, when the exhaust gas purifying catalysts 26a, 26b are generically used without being functionally distinguished from each other, they will be described as "exhaust gas purifying catalyst 26".

The engine system 100 comprises a plurality of sensors 30 to 40 for detecting various states in the engine system 100. Specifically, these sensors 30 to 40 are as follows. The sensor 30 is an accelerator position sensor for detecting an accelerator position, i.e., an angular position of a non-depicted accelerator pedal (which is equivalent to an amount of depression of the accelerator pedal manipulated by a driver). The sensor 31 is an airflow sensor for detecting an intake air amount which is equivalent to a flow rate of intake air passing through the intake passage 1. The sensor 32 is a throttle opening sensor for detecting a throttle opening which is an opening degree of the throttle valve 5. The sensor 33 is a pressure sensor for detecting an intake manifold pressure (internal pressure of an intake manifold) which is equivalent to a pressure of intake air supplied to the engine 10. The sensor 34 is a crank angle sensor for detecting a crank angle of the crankshaft 16. The sensor 35 is a water temperature sensor for detecting a water temperature which is a temperature of cooling water for cooling the engine 10. The sensor 36 is an in-cylinder temperature sensor for detecting an in-cylinder temperature which is an internal temperature of each cylinder of the engine 10. The sensors 37 and 38 are, respectively, an intake-side cam angle sensor for detecting operation timings of the intake valve 12 including a valve-close timing, and an exhaust-side cam angle sensor for detecting operation timings of the exhaust valve 17 including a valve-close timing. The sensor 39 is a vehicle speed sensor for detecting a speed of the vehicle (vehicle speed). The sensor 40 is a steering angle sensor for detecting a rotational angle (steering angle) of a steering wheel (not depicted) comprised in a non-depicted steering apparatus of the vehicle. The above sensors 30 to 40 are operable to output, to the controller 50, detection signals S130 to S140 corresponding to detected parameters, respectively.

The controller 50 comprises a non-depicted powertrain control module (PCM) or a transmission control module TCM. Based on the detection signals S130 to S140 input from the sensors 30 to 40, the controller 50 is operable to perform controls for various components in the engine system 100. Specifically, the controller 50 is operable to: supply a control signal S105 to the throttle valve 5 to control of opening and closing timings and the throttle opening of the throttle valve 5; supply a control signal S113 to the fuel injector 13 to control a fuel injection amount and a fuel injection timing; supply a control signal S114 to the spark plug 14 to control an ignition timing; and supply control signals S118, S119, respectively, to the intake variable valve timing mechanism 18 and the exhaust variable valve timing mechanism 19 to control the operation timings of the intake valve 12 and the exhaust valve 17. One or a combination of two or more of the throttle valve 5, the fuel injector 13, the spark plug 14, the intake variable valve timing mechanism 18 and the exhaust variable valve timing mechanism 19 is one example of "driving source adjusting mechanism" set forth in the appended claims.

The controller 50 is also operable to control an automatic transmission equipped in the vehicle. The following description will be made about the automatic transmission in the vehicle employing the vehicle control device according to this embodiment, and a control map for a lockup clutch of the automatic transmission, respectively, with reference to FIG. 3 and FIG. 4.

Figure 3:
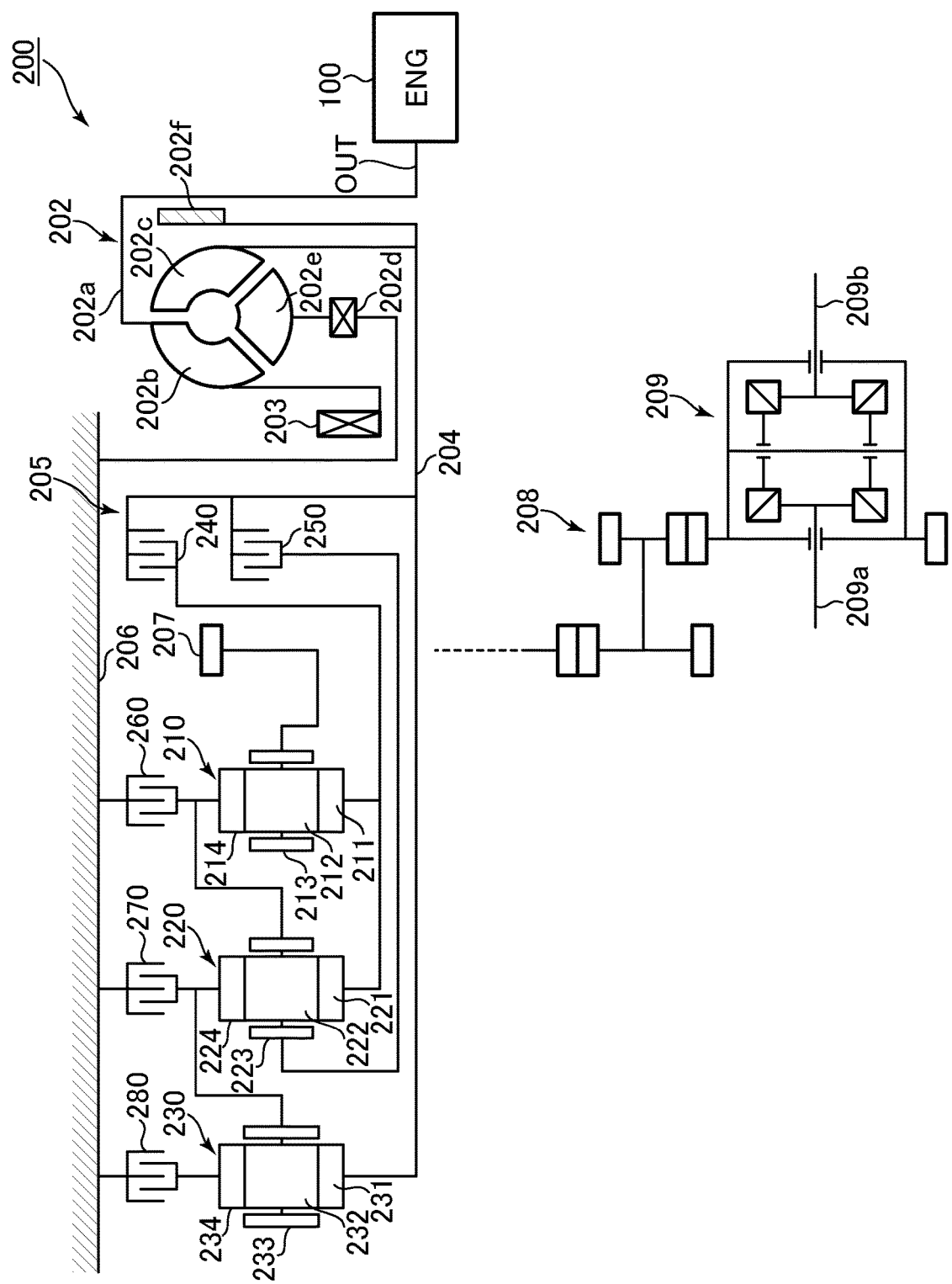
FIG. 3 is a schematic diagram depicting a configuration of an automatic transmission according to this embodiment.

FIG. 3 is a schematic diagram depicting a configuration of the automatic transmission 200 according to this embodiment. The automatic transmission 200 primarily comprises: a torque converter 202 attached to an engine output shaft OUT of the engine 10; an oil pump 203 configured to be driven by the engine output shaft OUT via the torque converter 202; and a speed change mechanism 205 configured such that an output rotation of the torque converter 202 is input thereinto via an input shaft 204, wherein the oil pump 203 and the speed change mechanism 205 are housed in a transmission housing 206 in such a manner as to be arranged around an axis of the input shaft 204.

The speed change mechanism 205 is configured such that an output rotation from an output gear 207 thereof disposed around the axis of the input shaft 204 is transmitted to a differential unit 20 via a counter drive mechanism 208 so as to drive left and right axle shafts 209a, 209b. Non-depicted road wheels are coupled, respectively, to the axle shafts 209a, 209b.

The torque converter 202 comprises: a casing 202a coupled to the engine output shaft OUT; a pump 202b fixedly installed inside the casing 202a; a turbine 202c disposed in opposed relation to the pump 202b and configured to be driven by the pump 202b via a hydraulic fluid; a stator 202e interposed between the pump 202b and the turbine 202c and supported by the transmission housing 206 via a one-way clutch 202d, whereby the stator 202e serves as a means to bring out a torque amplifying function; and a lockup clutch 202f provided between the casing 202a and the turbine 202c and configured to be selectively activated to directly couple the engine output shaft OUT and the turbine 202c together via the casing 202a. The torque converter 202 is configured such that a rotation of the turbine 202c is input into the speed change mechanism 205 via the input shaft 204.

The lockup clutch 202f is configured to be controlled by the controller 50 via a L/U hydraulic solenoid valve 291 (see FIG. 2), in such a manner that a degree of engagement (engagement degree) thereof is variably changed. The lockup clutch 202f is one example of "engagement element" set forth in the appended claims.

The speed change mechanism 205 comprises three first, second and third planetary gear sets (hereinafter referred to as "first, second and third gear sets") 210, 220, 230, which are arranged in this order from the side of the torque converter at positions on a side opposite to the torque converter with respect to the output gear 207 inside the transmission housing 206.

As a frictional element, the speed change mechanism 205 comprises a first clutch 240 and a second clutch 250, which are arranged at positions on the side of the torque converter with respect to the output gear 207, and further comprises a first brake 260, a second brake 270 and a third brake 280, which are arranged in this order from the side of the torque converter at positions on the side opposite to the torque converter with respect to the output gear 207.

Each of the first, second and third gear sets 210, 220, 230 is composed of a pinion-type planetary gear set which comprises: a sun gear (211, 221, 231); a plurality of pinions (212, 222, 232) meshed with the sun gear (211, 221, 231); a carrier (213, 223, 233) supporting the pinions (212, 222, 232); and a ring gear (214, 224, 234) meshed with the pinions (212, 222, 232).

The input gear 204 is coupled to the sun gear 231 of the third gear set 230, and the sun gear 211 of the first gear set 210, the ring gear 214 of the first gear set 210 and the ring gear 224 of the second gear set 220 are coupled, respectively, to the sun gear 221 of the second gear set 220, the carrier 223 of the second gear set 220 and the carrier 233 of the third gear set 230. Further, the output gear 207 is coupled to the carrier 213 of the first gear set 210.

The sun gear 211 of the first gear set 210 and the sun gear 221 of the second gear set 220 are disconnectably coupled to the input shaft 204 via the first clutch 240, and the carrier 223 of the second gear set 220 is disconnectably coupled to the input shaft 204 via the second clutch 250.

The ring gear 214 of the first gear set 210 and the carrier 223 of the second gear set 220 are disconnectably coupled to the transmission housing 206 via the first brake 260, and the ring gear 224 of the second gear set 220 and the carrier 233 of the third gear set 230 are disconnectably coupled to the transmission housing 206 via the second brake 270. Further, the ring gear 234 of the third gear set 230 is disconnectably coupled to the transmission housing 206 via the third brake 280.

In the above speed change mechanism 205, based on various combinations of engagement states of the first and second clutches 240, 250 and the first, second and third brakes 260, 270, 280, P (parking), N (neutral) and D (forward) ranges, and six (1st to 6th) speed stages in the D range, are achieved. In this case, respective engagement states of the first and second clutches 240, 250 and the first, second and third brakes 260, 270, 280 are controlled by the controller 50 via an AT hydraulic solenoid valve 290 (see FIG. 2). Exactly, the AT hydraulic solenoid valve 290 comprises a plurality of hydraulic solenoid valves for controlling the first and second clutches 240, 250 and the first, second and third brakes 260, 270, 280, individually.

Figure 4:
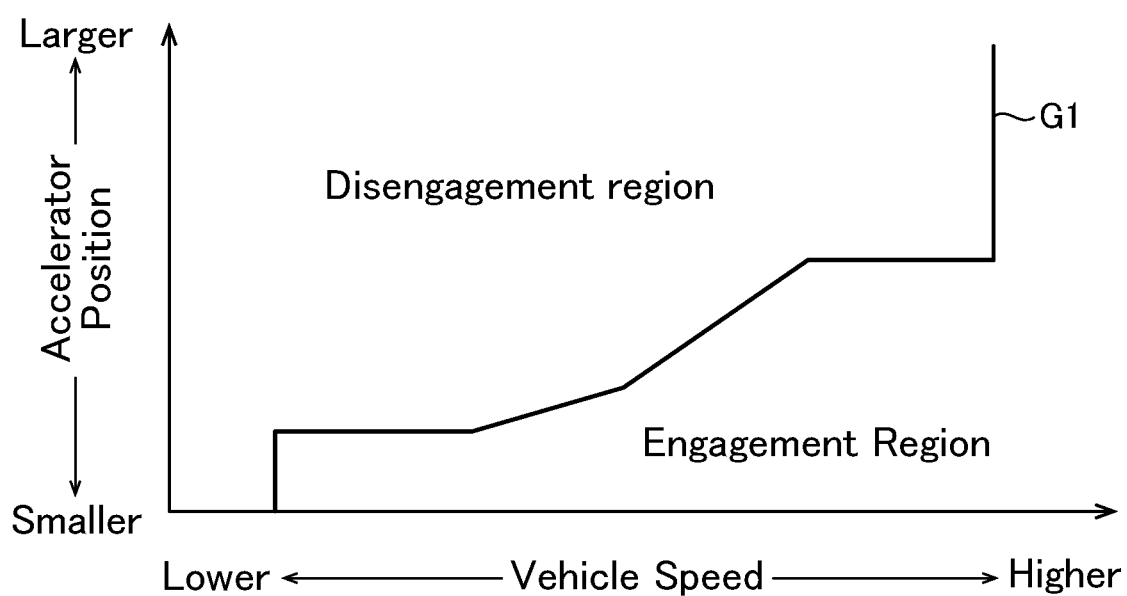
FIG. 4 is a lockup control map according to this embodiment.

FIG. 4 depicts a lockup control map for changing the engagement degree of the lockup clutch 202f in the vehicle control device according to this embodiment. In FIG. 4, the horizontal axis represents the vehicle speed, and the vertical axis represents the accelerator position. As depicted in FIG. 4, in this control map, a vehicle driving region defined by vehicle speed and accelerator position is divided into two sub-regions by a line G1 indicated by the solid line, wherein one sub-region is defined as a disengagement region in which the lockup clutch 202f is set to a disengaged state, and the other sub-region is defined as an engagement region in which the lockup clutch 202f is set to an engaged state. As used herein, the term "disengaged state" means the fully disengaged state of the lockup clutch 202f, and the term "engaged state" includes the slip state of the lockup clutch 202f in addition to the fully engaged state of the lockup clutch 202f. The slip state of the lockup clutch 202f is equivalent to a state in which a difference in rotational speed occurs between the engine output shaft OUT (corresponding to engine speed) and the turbine 202c. The engagement degree of the lockup clutch 202f is typically indicated by an engagement rate, a slip rate or a slip amount, and is used to define both of the disengaged state and the engaged state.

The controller 50 is operable to execute control for changing the engagement degree of the lockup clutch 202f (this control will hereinafter be referred to as "lockup control" or "engagement degree change control") via the L/U hydraulic solenoid valve 291 (see FIG. 2), based on changes in the vehicle speed and the accelerator speed, while referring to the lockup control map as depicted in FIG. 4. Specifically, the controller 50 is operable, according to the lockup control map, to perform control of changing the state of the lockup clutch 202f from the disengaged state to the engaged state (fully engaged state or slip state), and to perform control of changing the state of the lockup clutch 202f from the engaged state (fully engaged state or slip state) to the disengaged state. Further, the controller 50 is operable to change the engagement degree (i.e., slip rate or slip amount) of the lockup clutch 202f in the slip state.

Returning to FIG. 2, the controller 50 comprises the following functional elements. As a first element, the controller 50 comprises an engagement degree change control part 51 configured to perform the control of changing the engagement degree of the lockup clutch 202f (engagement degree change control), based on changes in the vehicle speed and the accelerator speed, while referring to the lockup control map as depicted in FIG. 4. Specifically, the engagement degree change control part 51 is operable to control a voltage or current to be applied to the UU hydraulic solenoid valve 291 (the voltage or current is equivalent to a hydraulic command value) so as to change the engagement degree of the lockup clutch 202f. As a second element, the controller 50 comprises a vehicle attitude control part 53 configured to, when a condition is satisfied that the vehicle is traveling, and a steering angle-related value (typically, steering speed) as a parameter related to a steering angle of the steering wheel increases, reduce the output torque of the engine 10 to generate a deceleration of the vehicle to thereby perform vehicle attitude control for controlling an attitude of the vehicle (this control will hereinafter be translated as "torque reduction control"). Particularly, in this embodiment, the vehicle attitude control part 53 is operable to reduce the output torque of the engine 10, according to the engagement degree of the lockup clutch 202f controlled by the engagement degree change control part 51. Typically, the vehicle attitude control part 53 is operable to control the engine 10 such that a reduction rate (a slope or a reduction degree during reduction) of the output torque of the engine 10 becomes greater than as the engagement degree of the lockup clutch 202f becomes smaller.

The above elements of the controller 50 are functionally realized by a computer which comprises: a CPU; various programs (including a basic control program such as an OS, and an application program capable of being activated on the OS to realize a specific function) to be interpreted and executed by the CPU; and an internal memory such as ROM or RAM storing therein the programs and a variety of data.
<Details of Control in this Embodiment>

Next, with reference to FIGS. 5 to 8, controls to be executed by the vehicle control device according to this embodiment will be described.

Figure 5:
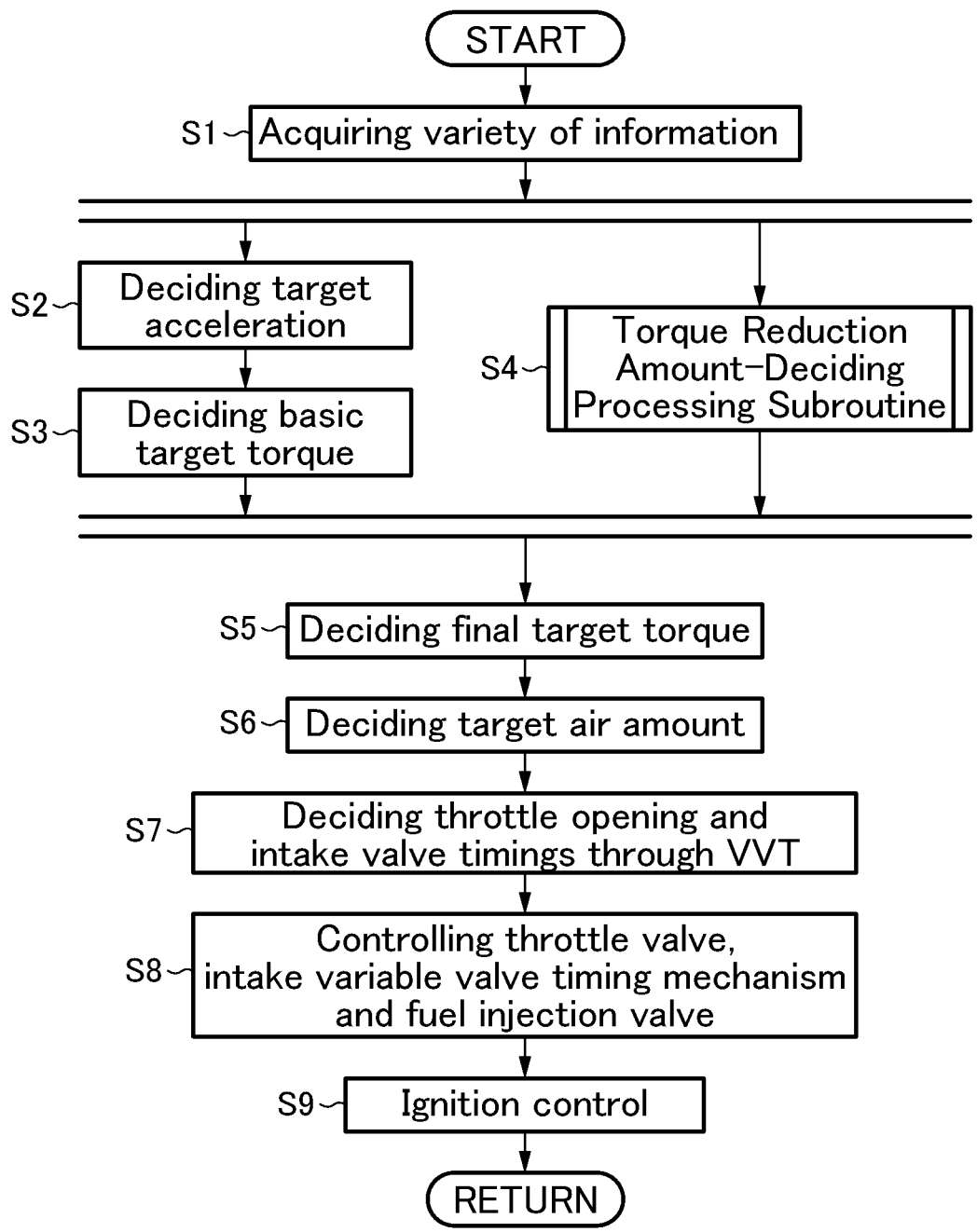
FIG. 5 is a flowchart of an engine control processing routine for use in this embodiment.
Figure 6:
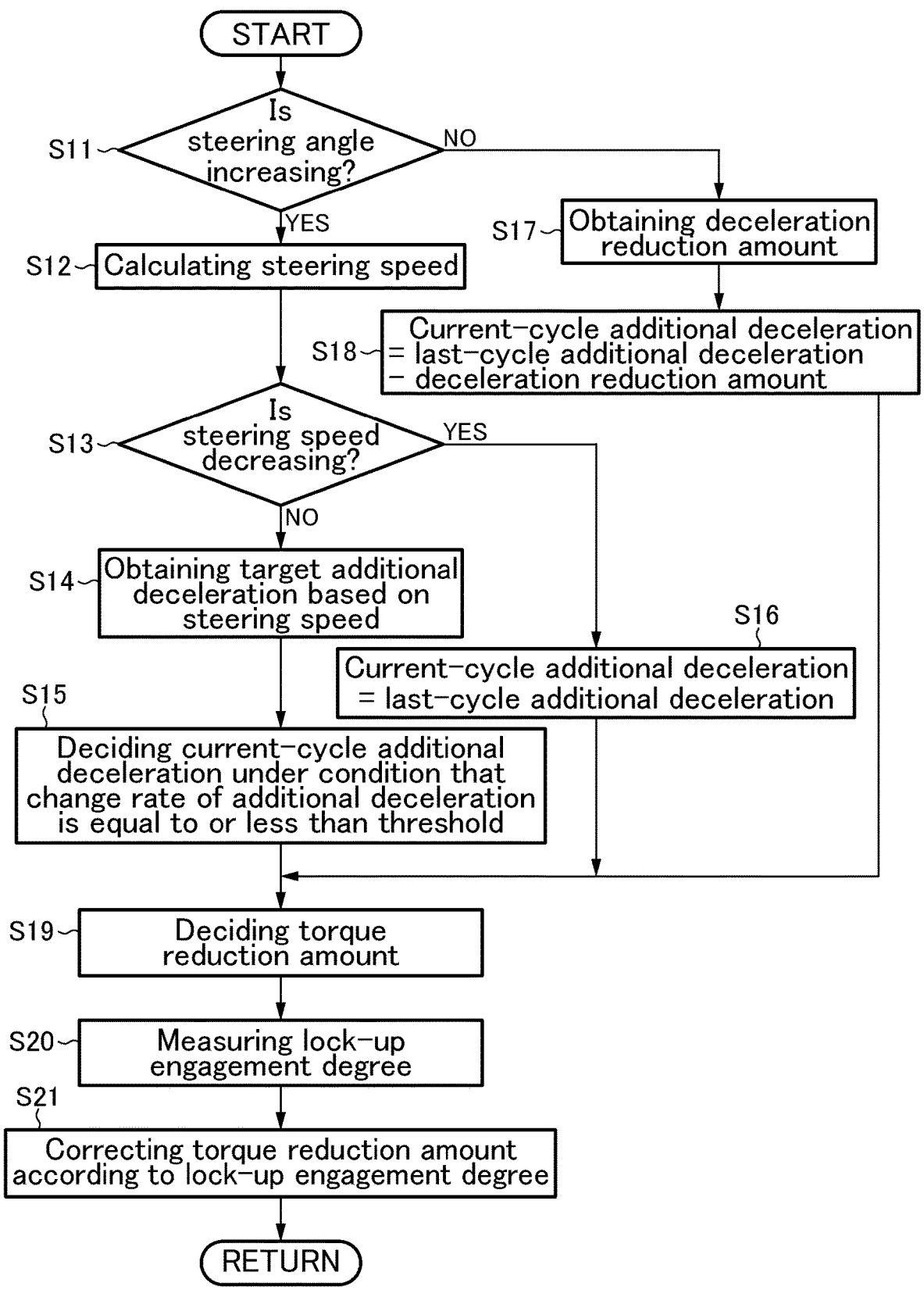
FIG. 6 is a flowchart of a torque reduction amount-deciding processing subroutine for use in this embodiment.
Figure 7:
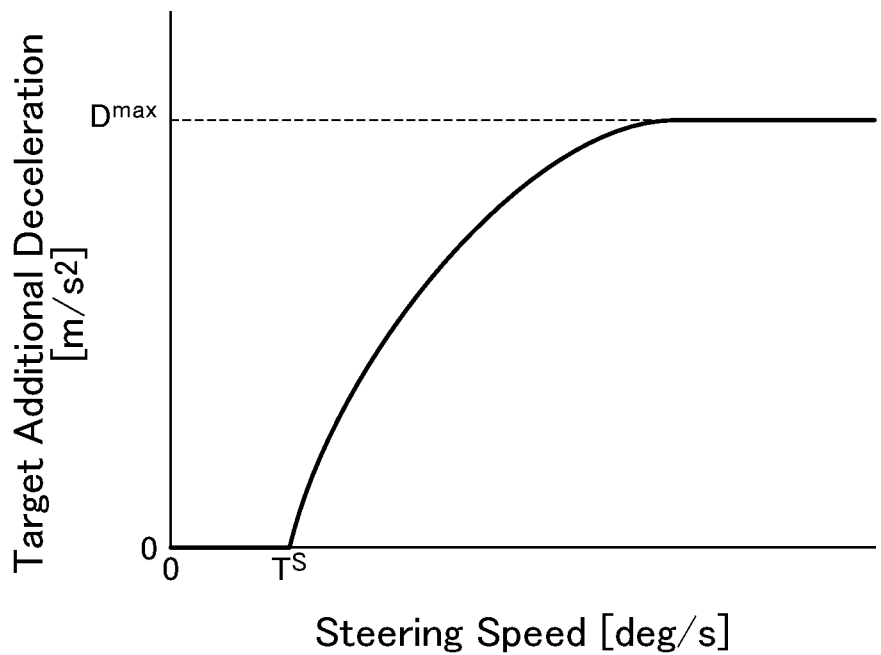
FIG. 7 is a map to be used by the vehicle control device according to this embodiment, so as to decide a target additional deceleration.
Figure 8:
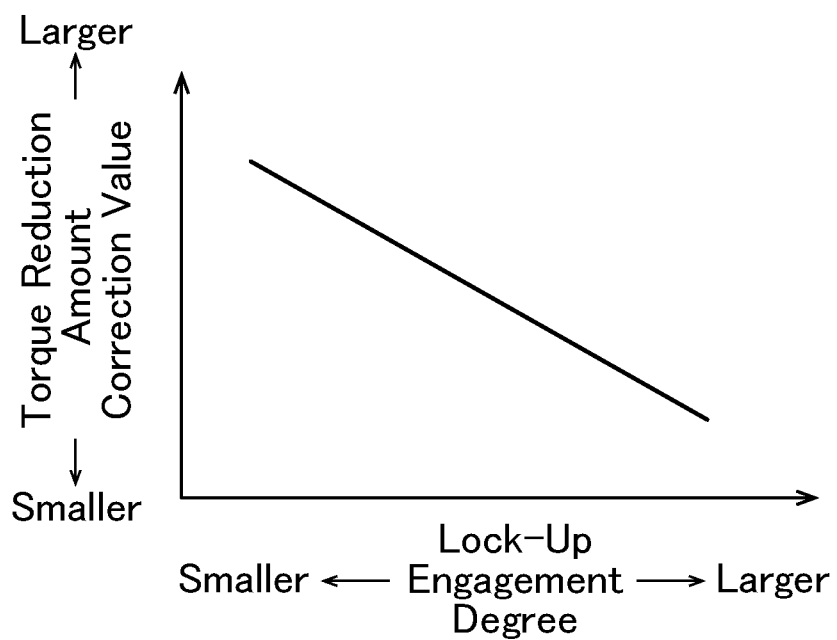
FIG. 8 is a map to be used by the vehicle control device according to this embodiment, so as to correct a torque reduction amount.

FIG. 5 is a flowchart of an engine control processing routine for use in this embodiment. FIG. 6 is a flowchart of a torque reduction amount-deciding processing subroutine for use in this embodiment. FIG. 7 is a map to be used by the vehicle control device according to this embodiment, so as to decide a target additional deceleration. FIG. 8 is a map to be used by the vehicle control device according to this embodiment, so as to correct a torque reduction amount.

The engine control processing routine in FIG. 5 is activated when an ignition switch of the vehicle is turned on to apply power to the controller 50, and repeatedly executed with a given cycle period. Basically, this engine control processing routine is executed during traveling of the vehicle.

As depicted in FIG. 5, upon start of the engine control processing routine, in step S1, the controller 50 operates to acquire information about a driving state of the vehicle. Specifically, the controller 50 operates to acquire, as information about the vehicle driving state, detection signals S130 to S140 output from the various sensors 30 to 40, including an accelerator position detected by the accelerator position sensor 30, a vehicle speed detected by the vehicle speed sensor 39, a steering angle detected by the steering angle sensor 40, and a speed stage currently set in the automatic transmission of the vehicle.

Subsequently, in step S2, the controller 50 operates to set a target acceleration based on the vehicle driving state including an accelerator pedal operation state, acquired in the step S1. Specifically, the controller 50 operates to select, from among a plurality of acceleration characteristic maps each defining a relationship between acceleration and accelerator position, with respect to various vehicle speeds and various speed stages (the maps are preliminarily created and stored in a memory or the like), one acceleration characteristic map corresponding to a current vehicle speed and a current speed stage, and decide, as a target acceleration, an acceleration corresponding to a current accelerator position, with reference to the selected acceleration characteristic map.

Subsequently, in step S3, the controller 50 operates to decide a basic target torque of the engine 10 for realizing the target acceleration decided in the step S2. In this processing, the controller 50 operates to decide the basic target torque within a torque range outputtable by the engine 10, based on normal parameters such as current vehicle speed, speed stage, road grade and road surface mu ($\mu$), and the engagement degree of the lockup clutch 202f.

In parallel with the processings in the steps S2 and S3, in step S4, the controller 50 operates to perform a torque reduction amount-deciding processing subroutine for deciding a torque reduction amount for use in the torque reduction control (vehicle attitude control), based on a steering angle of the steering wheel detected by the steering angle sensor 40. This torque reduction amount-deciding processing subroutine will be described with reference to FIG. 6.

As depicted in FIG. 6, upon start of the torque reduction amount-deciding processing subroutine, in step S11, the controller 50 operates to determine whether or not an absolute value of the steering angle acquired in the step S1 is increasing. As a result, when the absolute value of the steering angle is increasing (step S11: YES), the subroutine proceeds to step S12. In the step S12, the controller 50 operates to calculate a steering speed based on the steering angle acquired in the step S1.

Subsequently, in step S13, the controller 50 operates to determine whether or not an absolute value of the steering speed is decreasing. As a result, when the absolute value of the steering speed is not decreasing (step S13: No), i.e., the absolute value of the steering speed is increasing or the absolute value of the steering speed does not change, the subroutine proceeds to step S14. In the step S14, the controller 50 operates to obtain a target additional deceleration based on the calculated steering speed. This target additional deceleration is a deceleration to be added to the vehicle according to a steering wheel operation state in order to accurately realize a vehicle behavior as intended by a driver.

Specifically, the controller 50 operates to obtain a value of the target additional deceleration corresponding to the steering speed calculated in the step S12, based on a relationship between target additional deceleration and steering speed, shown by the map in FIG. 7.

In FIG. 7, the horizontal axis represents the steering speed, and the vertical axis represents the target additional deceleration. As depicted in FIG. 7, when the steering speed is less than a threshold $T_S$ (e.g., 10 deg/s), a corresponding value of the target additional deceleration is 0. That is, when the steering speed is less than the threshold $T_S$, the control of adding a deceleration to the vehicle according to the steering wheel operation state is not performed.

On the other hand, when the steering speed is equal to or greater than the threshold $T_S$, a value of the target additional deceleration corresponding to this steering speed comes closer to a given upper limit value (e.g., 1 m/s$^2$) as the steering speed becomes larger. That is, as the steering speed becomes larger, the target additional deceleration becomes larger, and an increase rate of the target additional deceleration becomes smaller.

Subsequently, in the step S15, the controller 50 operates to decide an additional deceleration in the current processing cycle (current-cycle additional deceleration), under a condition that the increase rate of the additional deceleration is equal to or less than a threshold $R_{max}$ (e.g., 0.5 m/s³).

Specifically, the controller 50 operates to, when an increase rate from an additional deceleration decided in the last processing cycle (last-cycle additional deceleration) to the target additional deceleration decided in the step S14 in the current processing cycle is equal to or less than the threshold $R_{max}$, decide the target additional deceleration decided in the step S14, as the current-cycle additional deceleration.

On the other hand, the controller 50 operates to, when the increase rate from the last-cycle additional deceleration to the target additional deceleration decided in the step S24 in the current processing cycle is greater than the threshold $R_{max}$, decide, as the current-cycle additional deceleration, a value obtained by increasing the last-cycle additional deceleration at the increase rate $R_{max}$ for the given cycle period.

Referring to the step S13 again, when the absolute value of the steering speed is decreasing (step S13: YES), the subroutine proceeds to step S16. In the step S16, the controller 50 operates to decide the last-cycle additional deceleration as the current-cycle additional deceleration. That is, when the absolute value of the steering speed is decreasing, a value of the additional deceleration corresponding to a maximum value of the steering speed (i.e., a maximum value of the additional deceleration) is maintained.

Referring to the step S11 again, when the absolute value of the steering wheel angle is not increasing (Step S11: NO), i.e., the absolute value of the steering wheel angle is maintained constant or is decreasing, the subroutine proceeds to step S17. In the step S17, the controller 50 operates to obtain an amount (deceleration reduction amount) by which the last-cycle additional deceleration is to be reduced in the current processing cycle. For example, the deceleration reduction amount may be calculated based on a constant reduction rate (e.g., 0.3 m/s³) preliminarily stored in a memory or the like. Alternatively, the deceleration reduction amount may be calculated based on a reduction rate decided according to the vehicle driving state acquired in the step S1 and/or the steering speed calculated in the step S12.

Subsequently, in step S18, the controller 50 operates to decide the current-cycle additional deceleration by subtracting the deceleration reduction amount obtained in the step S17 from the last-cycle additional deceleration.

After completion of the step S15, S16 or S18, in step S19, the controller 50 operates to decide the torque reduction amount, based on the current-cycle additional deceleration decided in the step S15, S16 or S18. Specifically, the controller 50 operates to decide a value of the torque reduction amount required for realizing the current-cycle additional deceleration, based on the normal parameter such as the current vehicle speed, speed stage and road gradient, and the engagement degree of the lockup clutch 202f, acquired in the step S1. In this processing, basically, the controller 50 operates to, during execution of the torque reduction control, decide the torque reduction amount, based on the engagement degree of the lockup clutch 202f at start of the torque reduction control (i.e., at a time when the condition for executing the torque reduction control is satisfied).

Subsequently, in step S20, the controller 50 operates to measure the engagement degree of the lockup clutch 202f (which is equivalent to an engagement rate or a slip rate of the lockup clutch 202f and will hereinafter be referred to simply as "lockup engagement degree"). In one example, the controller 50 operates to measure the lockup engagement degree, based on the difference between the engine speed and the rotational speed of the turbine 202c (i.e., difference in rotational speed between the engine output shaft OUT and the turbine 202c). In another example, the controller 50 operates to measure the lockup engagement degree, based on the hydraulic command value to be sent to the L/U hydraulic solenoid valve 291 for driving the lockup clutch 202f In yet another example, the controller 50 operates to measure the lockup engagement degree, based on a hydraulic pressure in a control hydraulic chamber of the lockup clutch 202f. In this example, a hydraulic sensor may be provided in an oil passage communicated with the control hydraulic chamber, and a hydraulic pressure detected by the hydraulic sensor may be used.

Subsequently, in step S21, the controller 50 operates to correct the torque reduction amount decided in the step S19, based on the lockup engagement degree measured in the step 20. Specifically, the controller 50 operates to correct the torque reduction amount, with reference to a correction map for correcting the torque reduction amount, as depicted in FIG. 8.

In FIG. 8, the horizontal axis represents the lockup engagement degree, and the vertical axis represents a torque reduction amount correction value for correcting the torque reduction amount. As the torque reduction amount correction value becomes larger, the torque reduction amount is more largely corrected, i.e., corrected such that a value (absolute value) thereof becomes larger. On the other hand, when the torque reduction amount correction value becomes smaller, the torque reduction amount is almost not corrected. As depicted in FIG. 8, in this embodiment, the correction map is configured such that, as the lockup engagement degree becomes smaller, the torque reduction amount correction value becomes larger. Thus, as the lockup engagement degree becomes smaller, the torque reduction amount (absolute value) is collected such that a value thereof becomes larger.

The reason why the torque reduction amount is corrected in this manner is as follows. Basically, when the output torque of the engine 10 (engine torque) is reduced by the torque reduction control, a deceleration will be generated in the vehicle. However, during the course of reducing the engine torque by the torque reduction control, the lockup control can be performed (i.e., the lockup engagement degree is changed). In this case, a torque to be applied to the road wheels via the automatic transmission 200 comprising the lockup clutch 202f is not adequately reduced according to the engine torque reduced by the torque reduction control. Particularly, when the lockup engagement degree is lowered during the torque reduction control, the torque to be applied to the road wheels will be reduced more gently than the engine torque reduced by the torque reduction control. Thus, a deceleration to be generated in the vehicle is reduced (specifically, a relatively gentle deceleration is generated in the vehicle), so that it becomes impossible to adequately realize a desired vehicle attitude by the torque reduction control.

Therefore, in this embodiment, the controller 50 is operable, when the lockup control is performed during the torque reduction control, to correct the torque reduction amount, according the lockup engagement degree. Particularly, the controller 50 is operable to use the torque reduction amount correction value obtained from the correction map as depicted in FIG. 8 to correct the torque reduction amount such that a value (absolute value) thereof becomes larger as the lockup engagement degree becomes smaller. As a result of this correction, the engine torque is more largely reduced (specifically, the engine torque is reduced with a steep slope (change rate or reduction rate) by the torque reduction control, so that it is possible to adequately ensure reduction of the torque to be applied to the road wheels, even under relatively low lockup engagement degree. This makes it possible to generate an adequate deceleration in the vehicle to realize a desired vehicle attitude by the torque reduction control.

After completion of the step S21, the controller 50 operates to terminate the torque reduction amount-deciding processing subroutine, and the subroutine returns to the main routine (see FIG. 5).

In the above step S11, it is determined whether or not the steering angle (absolute value) is increasing. Alternatively, it may be determined whether or not the steering speed (i.e., a speed of change in the steering angle) is equal to or greater than a given value. Specifically, in another embodiment, when the steering speed is equal to or greater than a first given value, a condition for starting the torque reduction control is determined to be satisfied, and the processings in the steps S13 to S16 and S19 are performed to decide the torque reduction amount. Then, when the steering speed is less than a second given value, a condition for terminating the torque reduction control is determined to be satisfied, and the processings in the steps S17 to S19 are performed to decide the torque reduction amount. As the first and second given values, values of the steering speed on the basis of the threshold $T_S$ in FIG. 7 may be used.

Returning to FIG. 5, after completion of the processings in the steps S2 and S3 and the torque reduction amount-deciding processing subroutine in the step S4, in step S5, the controller 50 operates to subtract the torque reduction amount decided by the torque reduction amount-deciding processing subroutine in the step S4 from the basic target torque decided in the step S3 to thereby decide a final target torque.

Subsequently, in step S6, the controller 50 operates to decide a target air amount and a target fuel amount which are required for the engine 10 to output the final target torque decided in the step S5. As used herein, the term "air amount" means an amount of air to be introduced into the combustion chamber 11 of the engine 10. It is to be understood that non-dimensional charging efficiency may be used in place of the air amount.

Specifically, the controller 50 operates to calculate a target indicated torque based on the final target torque and by additionally taking into consideration a loss torque due to friction loss and pumping loss, and calculate a target fuel amount required for generating the target indicated torque, and, based on the calculated target fuel amount and a target equivalent ratio, to decide the target air amount.

Subsequently, in the step S7, the controller 50 operates to decide an opening degree of the throttle valve 5, and opening and closing timings of the intake valve 12 through the intake variable valve timing mechanism 18, while taking into account the air amount detected by the airflow sensor 31, so as to enable air to be introduced into the engine 10 in an amount equal to the target air amount decided in the step S6.

Subsequently, in step S8, the controller 50 operates to control the throttle valve 5 and the intake variable valve timing mechanism 18, based on the throttle opening and the opening and closing timings of the intake valve 12 set in the step S7, and control the fuel injector 13, based on the target fuel amount decided in the step S6.

Subsequently, in step S9, the controller 50 operates to set an ignition timing required for the engine 10 to output the final target torque, based on the final target torque decided in the step S5, and an actual air amount actually introduced into the combustion chamber 11 by controlling the throttle valve 5 and the intake variable valve timing mechanism 18 in the step S7, and control the spark plug 14 so as to perform ignition at the decided ignition timing. After completion of the step S9, the controller 50 completes one cycle of the engine control processing routine.

<Functions/Effects>

Figure 9:
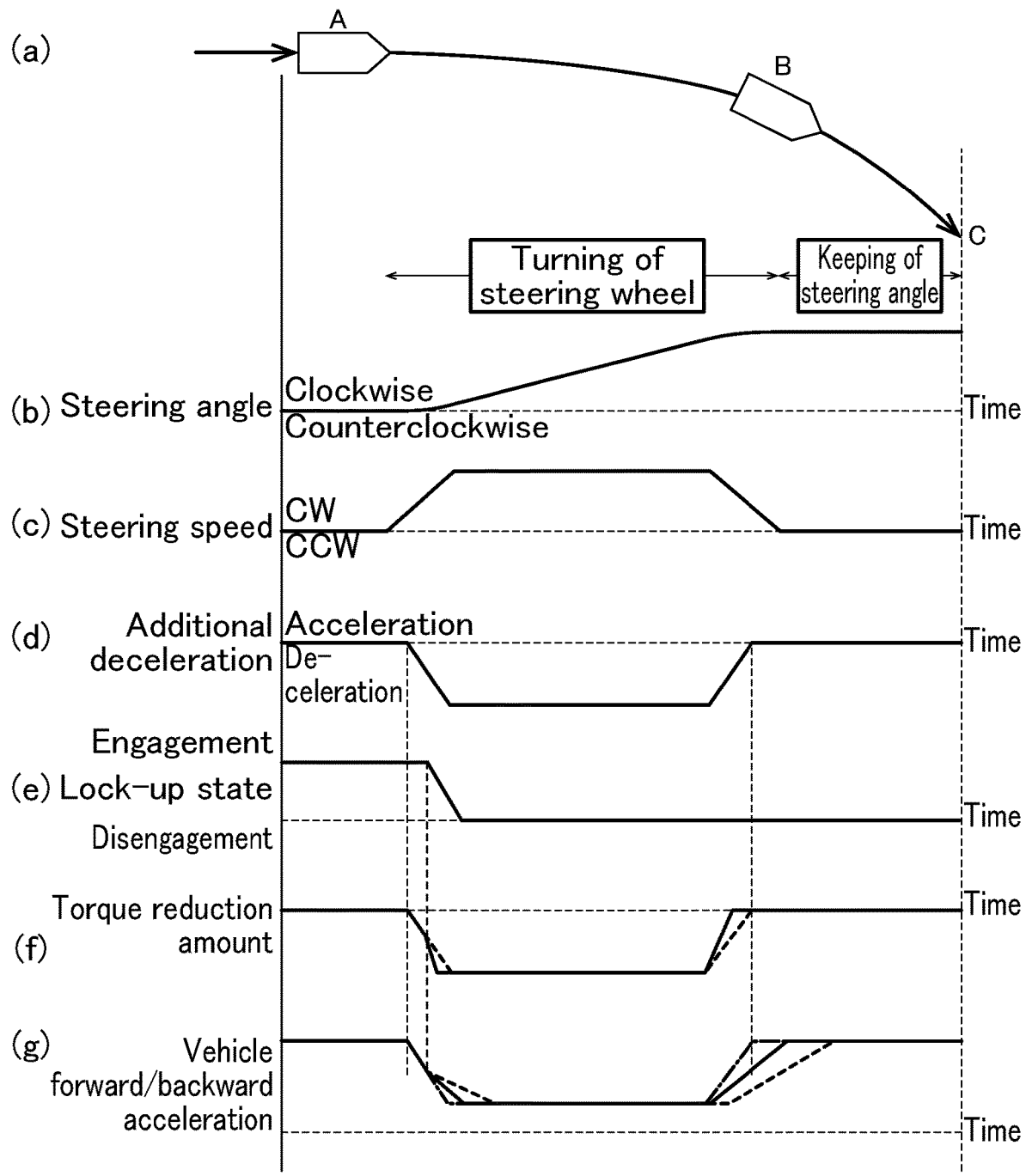
FIG. 9 shows time charts (a) to (g) for explaining functions/effects of the vehicle control device according to this embodiment.

Next, with reference to FIG. 9, functions/effects of the vehicle control device according to this embodiment will be described. FIG. 9 shows time charts (a) to (g) presenting temporal changes in various parameters related to engine control in a situation where a vehicle equipped with the vehicle control device according to this embodiment is turning by a steering wheel operation.

The chart (a) in FIG. 9 is a top plan view schematically depicting the vehicle which is turning in a clockwise direction. As depicted in the chart (a), the vehicle starts clockwise turning from a position A, and continues the clockwise turning from a position B to a position C at a constant steering angle.

The chart (b) in FIG. 9 is a chart presenting a change in steering angle of the vehicle which is turning in the clockwise direction as depicted in the chart (a). In the chart (b), the horizontal axis represents the time, and the vertical axis represents the steering angle.

As depicted in the chart (b), clockwise steering is started at the position A, and then, along with operation of additionally turning the steering wheel, a clockwise steering angle gradually increases and reaches a maximum value at the position B. Subsequently, the steering angle is maintained constant until the vehicle reaches the position C (Keeping of the steering angle).

The chart (c) in FIG. 9 is a chart presenting a change in steering speed of the vehicle which is turning in the clockwise direction as depicted in the chart (a). In the chart (c), the horizontal axis represents the time, and the vertical axis represents the steering speed.

The steering speed in the vehicle is expressed as a temporal differentiation of the steering angle of the vehicle. That is, as depicted in the chart (c), when clockwise steering is started at the position A, a clockwise steering speed arises and is maintained approximately constant in an intermediate zone between the position A and the position B. Then, when the clockwise steering speed decreases and the clockwise steering angle reaches the maximum value at the position B, the steering speed becomes 0. Then, when the clockwise steering angle is maintained during traveling from the position B to the position C, the steering speed is kept at 0.

The chart (d) in FIG. 9 is a chart presenting a change in additional deceleration decided based on the steering speed presented in the chart (c). In the chart (d), the horizontal axis represents the time, and the vertical axis represents the additional deceleration.

As described with reference to FIG. 6, when the absolute value of the steering angle is determined to be increasing, and the absolute value of the steering speed is determined to be not decreasing (in FIG. 6, the step S11: YES, and the step S13: NO), the controller 50 operates to obtain the target additional deceleration according to the steering speed (see FIG. 7), and to decide the additional deceleration under the condition that the increase rate of the additional deceleration is equal to or less than the threshold $R_{max}$ (step S15 in FIG. 6), as depicted in the chart (d). That is, the controller 50 operates to increase the additional deceleration such that the increase rate thereof falls within the threshold $R_{max}$. Then, when the absolute value of the steering angle is determined to be increasing, and the absolute value of the steering speed is determined to be decreasing (in FIG. 6, the step S11: YES, and the step S13: YES), the controller 50 operates to maintain the additional deceleration corresponding the maximum steering speed. On the other hand, when the absolute value of the steering angle is determined to be decreasing (in FIG. 6, the step S11: NO), the controller 50 operates to obtain the deceleration reduction amount, and reduce the additional deceleration by the deceleration reduction amount (steps S17, S18 in FIG. 6).

The chart (e) in FIG. 9 is a chart presenting a change in lockup state (engaged state, disengaged state) corresponding to the engagement degree of the lockup clutch 202f In the chart (e), the horizontal axis represents the time, and the vertical axis represents the lockup state. Suppose that the lockup clutch 202f is set in the engaged state at the start of the torque reduction control.

As depicted in the chart (e), in the middle of the operation of additionally turning the steering wheel in the zone between the position A and the position B, specifically, just after the start of the torque reduction control, the controller 50 operates to execute the lockup control of changing the state of the lockup clutch 202f from the engaged state to the disengaged state, according to a change in the vehicle speed and/or the accelerator position.

The chart (f) in FIG. 9 presents a change in the torque reduction amount decided based on the additional deceleration depicted in the chart (d). In the chart (f), the horizontal axis represents the time, and the vertical axis represents the torque reduction amount. In the chart (f), the solid line indicates a change in the torque reduction amount in this embodiment, and the dotted line indicates a change in torque reduction amount in a comparative example.

In the comparative example, the torque reduction amount required for realizing the above additional deceleration is decided based on the normal parameters such as current vehicle speed, speed stage and road grade, without taking into account a change in the lockup engagement degree as depicted in the chart (e). Suppose that, in the example depicted in FIG. 9, each of the above parameters is constant, and thus the decided torque reduction amount is changed in the same pattern as that of the additional deceleration depicted in the chart (d) (see the dotted line in the chart (f).

On the other hand, in this embodiment, the controller 50 operates to decide the torque reduction amount while taking into account a change in the lockup engagement degree as depicted in the chart (e), in addition to the normal parameters such as the current vehicle speed, speed stage and road grade. Specifically, the controller 50 operates to correct the torque reduction amount according to the additional deceleration depicted in the chart (d) (i.e., torque reduction amount decided to realize the additional deceleration, based on the above parameters), according to the lockup engagement degree. As one example, the controller 50 operates to refer to the correction map as depicted in FIG. 8 and correct the torque reduction amount by the torque reduction amount correction value according to the lockup engagement degree. In this case, when the state of the lockup clutch 202f is changed from the engaged state to the disengaged state, the lockup engagement degree is lowered. Thus, the controller 50 operates to use a relatively large torque reduction amount correction value to correct the torque reduction amount such that a value (absolute value) thereof is increased. As a result, at a rising edge of the torque reduction amount just after the start of the torque reduction control, the corrected torque reduction amount (see the solid line in the chart (f)) increases with a slope (change rate) steeper than that of the non-corrected (original) torque reduction amount (see the dotted line in the chart (f)). On the other hand, at a falling edge of the torque reduction amount just before the termination of the torque reduction control, i.e., when returning from the torque reduction control, the corrected torque reduction amount (see the solid line in the chart (f)) decreases with a slope (change rate) steeper than that of the non-corrected (original) torque reduction amount (see the dotted line in the chart (f)).

The controller 50 operates to subtract the torque reduction amount decided by the torque reduction amount-deciding processing subroutine, from the basic target torque (in this example, suppose that the basic target torque is approximately constant), to thereby decide the final target torque. Thus, a change in the torque reduction amount depicted in the chart (f) is reflected on the final target torque. That is, the final target torque is changed in the same pattern as that of the torque reduction amount in the chart (f), although this final target torque is not depicted in FIG. 9.

The chart (g) in FIG. 9 is a chart presenting a change in forward/backward acceleration generated in the vehicle. In the chart (g), the horizontal axis represents the time, and the vertical axis represents the vehicle forward/backward acceleration. In the chart (g), the solid line indicates a vehicle forward/backward acceleration generated in the case where the torque reduction control is performed using the torque reduction amount corrected by the vehicle control device according to this embodiment, when the lockup engagement degree is changed during the torque reduction control, and the dotted line indicates a vehicle forward/backward acceleration generated in the case where the torque reduction control is performed using the torque reduction amount in the comparative example, when the lockup engagement degree is changed during the torque reduction control.

Further, in the chart (g), the one-dot chain line indicates a vehicle forward/backward acceleration generated in the case where the torque reduction control is performed using a torque reduction amount decided to realize the additional deceleration, based on only the normal parameters such as the current vehicle speed, speed stage and road grade, when the lockup engagement degree is not changed during the torque reduction control (this torque reduction amount is a normal torque reduction amount and is identical to the torque reduction amount in the comparative example). This vehicle forward/backward acceleration indicated by the one-dot chain line corresponds to a desired vehicle attitude to be realized by the torque reduction control.

In both of this embodiment and the comparative example, the final target torque is reduced by the torque reduction control, so that a certain deceleration will be generated in the vehicle at the start of the torque reduction control. In this process, in the comparative example, even when the lockup engagement degree is changed to be lowered, after the start of the torque reduction control, the torque reduction amount is decided without taking into account the change in the lockup engagement degree (see the dotted line in the chart (f)). Thus, in the comparative example, a torque to be applied to the road wheels via the automatic transmission 200 comprising the lockup clutch 202f is not adequately reduced according to the engine torque reduced by the torque reduction control. More specifically, the torque is reduced more gently than the engine torque reduced by the torque reduction control. This is because a value of the torque reduction amount to be used in the torque reduction control is decided based on the engagement degree of the lockup clutch 202*f* at a time when the condition for starting the torque reduction control is satisfied (in this example, the engaged state). That is, a value of the torque reduction amount decided on the assumption that the lockup clutch 202*f* is in the engaged state is not appropriate to quickly reducing a vehicle driving torque in a situation where the lockup clutch 202*f* is set in the disengaged state (the lockup engagement degree is lowered). Thus, in the comparative example, as indicated by the dotted line in the chart (g), a deceleration generated in the vehicle is reduced as compared to the one-dot chain line in the chart (g), i.e., a relatively gentle deceleration is generated in the vehicle. Therefore, in the comparative example, it is difficult to adequate realize a desired vehicle attitude by the torque reduction control.

On the other hand, in this embodiment, the controller 50 operates, when the lockup engagement degree is changed to be lowered after the start of the torque reduction control, to correct the torque reduction amount according the changed lockup engagement degree. Specifically, the controller 50 operates to correct the torque reduction amount such that a value (absolute value) thereof is increased as the lockup engagement degree is lowered (see the solid line in the chart (f)). Thus, the engine torque is more largely reduced by the torque reduction control (specifically, the engine torque is reduced with a steep slope (change rate or reduction rate), so that it is possible to adequate ensure reduction of torque to be applied to the road wheels, even under a relatively low lockup engagement degree. This makes it possible to generate an adequate deceleration in the vehicle as indicated by the solid line in the chart (g), more specifically, quickly apply a deceleration to the vehicle in approximately the same pattern as the one-dot chain line in the chart (g), to cause a load shift toward front road wheels to thereby increase a frictional force between each of the front road wheels and a road surface and thus increase a cornering force of the front road wheels. As a result, turn-in ability of the vehicle is improved, i.e., a relatively large yaw rate (in this case, clockwise yaw rate) is generated in the vehicle. Therefore, in this embodiment, it becomes possible to control the vehicle attitude with good responsivity with respect to a steering wheel operation by a driver to accurately realize a vehicle behavior as intended by the driver. That is, it becomes possible to adequately improve steering stability of the vehicle.

Then, just before the position B, the torque reduction amount is reduced to return the engine torque to the original value before the torque reduction control. Specifically, in this embodiment, the torque reduction amount is reduced with a slope (change rate) steeper than that in the comparative example, as depicted in the chart (f). Thus, in this embodiment, as indicated by the solid line in the chart (g), the vehicle forward/backward acceleration quickly rises in approximately the same pattern as the one-dot chain line in the chart (g). Therefore, in this embodiment, it is possible to quickly return to an original state before the torque reduction control (vehicle attitude control). In contrast, in the comparative example, as indicated by the dotted line in the chart (g), the vehicle forward/backward acceleration rises more gently than the one-dot chain line in the chart (g), so that the return to the original state before the torque reduction control (vehicle attitude control) is delayed.

As described with reference to FIG. 9, in this embodiment, when performing the torque reduction control, a value of the torque reduction amount decided according the engagement degree of the lockup clutch 202*f* controlled (changed) by the lockup control is used. Thus, even in a situation where the lockup engagement degree is changed during the torque reduction control, it becomes possible to ensure a torque reduction (the term "torque" herein means a torque to be applied as a vehicle driving force to the road wheels) appropriate for controlling the vehicle attitude by the torque reduction control. This makes it possible to apply, to the vehicle, a desired deceleration for controlling the vehicle attitude. Therefore, the vehicle control device according to this embodiment can control the vehicle attitude with good responsivity with respect to a steering action performed by a driver, so as to accurately realize a vehicle behavior as intended by the driver, i.e., adequately improve steering stability of the vehicle.

FIG. 9 shows one example where the control using the vehicle control device according to this embodiment is executed in the situation where the lockup engagement degree is changed by the lockup control during the torque reduction control. It is to be understood that the control using the vehicle control device according to this embodiment may be executed in a situation where the torque reduction control is performed when the lockup engagement degree is being changed by the lockup control. In this case, the torque reduction control may also be performed using a value of the torque reduction amount according to the lockup engagement degree changed by the lockup control.

Modifications

The following description will be made about some modifications of the above embodiment.

Although the above embodiment has been described based on an example in which, in the case where both of the torque reduction control and the lockup control are performed, the torque reduction control is always performed using a value of the torque reduction amount according to the lockup engagement degree controlled by the lockup control. Alternatively, the torque reduction control using a value of the torque reduction amount according to the lockup engagement degree may be performed only when only when at least one of a speed of change (or an amount of change) in the engagement degree of the lockup clutch 202*f* controlled by the lockup control, and a difference between a target value and an actual value of the engagement degree of the lockup clutch 202*f* controlled by the lockup control is equal to or greater than a given value. That is, suppose that at least one of them is less than the given value. In this case, even when the lockup engagement degree is changed by the lockup control, the torque reduction control may be performed using a normal torque reduction amount without taking into consideration the change in the lockup engagement degree (i.e., a torque reduction amount which is not corrected according the lockup engagement degree). This makes it possible to suppress a situation where, in response to a slight change in the lockup engagement degree, a slight change in the torque reduction amount is frequently performed, causing the occurrence of hunching in the torque reduction control.

In the above embodiment, when the torque reduction control is performed to reduce the engine torque according the lockup engagement degree, the torque reduction amount is corrected by the torque reduction amount correction value according to the lockup engagement degree, while referring to the correction map depicted in FIG. 8. Alternatively, instead of correcting the torque reduction amount according to the lockup engagement degree, the torque reduction amount may be set, based on the additional deceleration decided based on the steering speed or the like (decided in one of the steps S15, S16 and S18 in FIG. 6), and the lockup engagement degree. In this case, a map of torque reduction amounts calculated based on the additional deceleration and the lockup engagement degree may be preliminarily created, and the controller 50 may be configured to refer to the map to set one of the torque reduction amounts corresponding to a current additional deceleration and a current lockup engagement degree.

Although the above embodiment has been described based on an example where the lockup control map is defined by the vehicle speed and the accelerator position (see FIG. 4), the lockup control map is not limited to a map defined by the vehicle speed itself and the accelerator position itself. For example, instead of the vehicle speed, a parameter related to the vehicle speed (vehicle speed-related value) such as engine speed may be used to define the lockup control map. Further, instead of the accelerator position, a parameter related to the accelerator position (accelerator position-related value) such as throttle opening, fuel injection amount, engine load or charging efficiency may be used to define the lockup control map.

The above embodiment has been described based on an example where the vehicle employing the vehicle control device is equipped with the engine 10 for driving the drive road wheels. Alternatively, the vehicle control device according to the present invention is also applicable to a vehicle (typically, a HV vehicle or an EV vehicle) equipped with a motor for driving drive road wheels by electric power supplied from a battery or a capacitor. In this case, the controller 50 is configured to perform control of reducing an output torque of the motor, as the torque reduction control (vehicle attitude control). In this case, the motor is equivalent to "driving source" set forth in the appended claims, and various actuators for adjusting the output torque of the motor are equivalent to "driving source adjusting mechanism" set forth in the appended claims.

The above embodiment has been described based on an example where the present invention is used in the situation where the engagement degree of the lockup clutch 202f of the torque converter 202 is changed. However, the present invention is also usable in a situation where an engagement degree of any of various engagement elements (typically, a clutch) other than the lockup clutch 202f is changed, wherein the engagement element is provided in a driving force transmitting mechanism for transmitting an output torque of the above driving source to road wheels. In this case, the torque reduction control may also be executed using a value of the torque reduction amount according to the engagement degree of the engagement element.

In the above embodiment, the torque reduction control (vehicle attitude control) is executed based on the steering angle and the steering speed. Alternatively, the torque reduction control may be executed based on yaw rate or lateral acceleration, instead of the steering angle and the steering speed. Each of the steering angle, the steering speed, the yaw rate and the lateral acceleration is one example of "steering angle-related value" set forth in the appended claims.

What is claimed is:

1. A vehicle control device, comprising:
   a driving source configured to generate torque as a driving force for vehicle traveling;
   a driving source adjusting mechanism configured to adjust an output torque of the driving source;
   a driving force transmitting mechanism configured to transmit the output torque of the driving source to road wheels;
   an engagement element provided in the driving force transmitting mechanism;
   an engagement degree change control part configured to perform control of changing an engagement degree of the engagement element; and
   a vehicle attitude control part configured to control the driving source adjusting mechanism to reduce the output torque of the driving source to thereby generate a deceleration of the vehicle so as to control an attitude of the vehicle, when such a condition that the vehicle is traveling and a steering angle-related value as a parameter related to a steering angle of a steering apparatus of the vehicle increases is satisfied,
   wherein the vehicle attitude control part is configured to control the driving source adjusting mechanism to reduce the output torque of the driving source, in accordance with the engagement degree of the engagement element controlled by the engagement degree change control part.

2. The vehicle control device according to claim 1, wherein, when the engagement degree is a first engagement degree, the vehicle attitude control part is configured to control the driving source adjusting mechanism such that a reduction rate of the output torque of the driving source becomes greater than when the engagement degree is a second engagement degree greater than the first engagement degree.

3. The vehicle control device according to claim 2, wherein the vehicle attitude control part is configured to control the driving source adjusting mechanism such that the reduction rate of the output torque of the driving source becomes greater as the engagement degree becomes smaller.

4. The vehicle control device according to claim 3, wherein the vehicle attitude control part is configured to execute the control of reducing the output torque of the driving source in accordance with the engagement degree of the engagement element, only when at least one of a speed of change in the engagement degree controlled by the engagement degree change control part, an amount of change in the engagement degree controlled by the engagement degree change control part, and a difference between a target value and an actual value of the engagement degree controlled by the engagement degree change control part, is equal to or greater than a given value.

5. The vehicle control device according to claim 4, wherein the driving force transmitting mechanism comprises a torque converter with a lockup clutch, and wherein the engagement element is the lockup clutch.

6. The vehicle control device according to claim 5, wherein the engagement degree change control part is configured to change the engagement degree of the engagement element, based on a vehicle speed-related value as a parameter related to a vehicle speed, and an accelerator position-related value as a parameter related to an accelerator position.

7. The vehicle control device according to claim 6, wherein the vehicle is further equipped with a steering angle sensor configured to detect the steering angle of the steering apparatus, and wherein the vehicle attitude control part is configured, when the vehicle is traveling, and a speed of change in the steering angle detected by the steering angle sensor is equal to or greater than a given value, to control the driving source adjusting mechanism to reduce the output torque of the driving source.

8. The vehicle control device according to claim 1, wherein the vehicle attitude control part is configured to control the driving source adjusting mechanism such that a reduction rate of the output torque of the driving source becomes greater as the engagement degree becomes smaller.

9. The vehicle control device according to claim 8, wherein the vehicle attitude control part is configured to execute the control of reducing the output torque of the driving source in accordance with the engagement degree of the engagement element, only when at least one of a speed of change in the engagement degree controlled by the engagement degree change control part, an amount of change in the engagement degree controlled by the engagement degree change control part, and a difference between a target value and an actual value of the engagement degree controlled by the engagement degree change control part, is equal to or greater than a given value.

10. The vehicle control device according to claim 9, wherein the driving force transmitting mechanism comprises a torque converter with a lockup clutch, and wherein the engagement element is the lockup clutch.

11. The vehicle control device according to claim 10, wherein the engagement degree change control part is configured to change the engagement degree of the engagement element, based on a vehicle speed-related value as a parameter related to a vehicle speed, and an accelerator position-related value as a parameter related to an accelerator position.

12. The vehicle control device according to claim 11, wherein the vehicle is further equipped with a steering angle sensor configured to detect the steering angle of the steering apparatus, and wherein the vehicle attitude control part is configured, when the vehicle is traveling, and a speed of change in the steering angle detected by the steering angle sensor is equal to or greater than a given value, to control the driving source adjusting mechanism to reduce the output torque of the driving source.

13. The vehicle control device according to claim 1, wherein the vehicle attitude control part is configured to execute the control of reducing the output torque of the driving source in accordance with the engagement degree of the engagement element, only when at least one of a speed of change in the engagement degree controlled by the engagement degree change control part, an amount of change in the engagement degree controlled by the engagement degree change control part, and a difference between a target value and an actual value of the engagement degree controlled by the engagement degree change control part, is equal to or greater than a given value.

14. The vehicle control device according to claim 13, wherein the driving force transmitting mechanism comprises a torque converter with a lockup clutch, and wherein the engagement element is the lockup clutch.

15. The vehicle control device according to claim 1, wherein the driving force transmitting mechanism comprises a torque converter with a lockup clutch, and wherein the engagement element is the lockup clutch.

16. The vehicle control device according to claim 15, wherein the engagement degree change control part is configured to change the engagement degree of the engagement element, based on a vehicle speed-related value as a parameter related to a vehicle speed, and an accelerator position-related value as a parameter related to an accelerator position.

17. The vehicle control device according to claim 1, wherein the engagement degree change control part is configured to change the engagement degree of the engagement element, based on a vehicle speed-related value as a parameter related to a vehicle speed, and an accelerator position-related value as a parameter related to an accelerator position.

18. The vehicle control device according to claim 1, wherein the vehicle is further equipped with a steering angle sensor configured to detect the steering angle of the steering apparatus, and wherein the vehicle attitude control part is configured, when the vehicle is traveling, and a speed of change in the steering angle detected by the steering angle sensor is equal to or greater than a given value, to control the driving source adjusting mechanism to reduce the output torque of the driving source.

19. The vehicle control device according to claim 1,
wherein the driving source is an engine comprising a spark plug provided at a position facing a combustion chamber of the engine, and the engagement element is a clutch, and the vehicle attitude control part is configured to control the ignition timing of the spark plug and the engagement degree of the clutch, and
wherein the vehicle attitude control part is configured to, when the condition is satisfied, set a retard amount of the ignition timing of the spark plug in accordance with the engagement degree of the clutch, and to cause the spark plug to be activated at the ignition timing based on the set retard amount.

20. The vehicle control device according to claim 1,
wherein the driving source is an engine comprising a spark plug provided at a position facing a combustion chamber of the engine, and the driving force transmitting mechanism comprises a torque converter with a lockup clutch, and the engagement element is the lockup clutch, and the vehicle attitude control part is configured to control an ignition timing of the spark plug and an engagement degree of the lockup clutch,
wherein the vehicle is further equipped with a vehicle speed sensor and a steering angle sensor, and
wherein the vehicle attitude control part is configured, when the condition is determined to be satisfied based on a detection value of the vehicle speed sensor and a detection value of the steering angle sensor, to set a retard amount of the ignition timing of the spark plug to a larger value as the engagement degree of the lockup clutch becomes smaller, and to cause the spark plug to be activated at the ignition timing based on the set retard amount.

* * * * *